United States Patent
Golgiri et al.

(10) Patent No.: US 11,753,074 B2
(45) Date of Patent: Sep. 12, 2023

(54) USER ENGAGEMENT SWITCH FOR REMOTE TRAILER MANEUVERING

(71) Applicant: Ford Global Technologies, LLC, Dearborn, MI (US)

(72) Inventors: Hamid M. Golgiri, Livonia, MI (US); Erick Michael Lavoie, Van Buren Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 642 days.

(21) Appl. No.: 16/805,127

(22) Filed: Feb. 28, 2020

(65) Prior Publication Data

US 2021/0269092 A1    Sep. 2, 2021

(51) Int. Cl.
*G05D 1/00* (2006.01)
*B62D 13/06* (2006.01)
*G06F 3/04883* (2022.01)
*G05D 1/02* (2020.01)

(52) U.S. Cl.
CPC .......... *B62D 13/06* (2013.01); *G05D 1/0033* (2013.01); *G06F 3/04883* (2013.01); *G05D 1/0212* (2013.01)

(58) Field of Classification Search
None
See application file for complete search history.

(56) References Cited

U.S. PATENT DOCUMENTS

| 2015/0198949 A1* | 7/2015 | Boos | G06F 3/04883 701/2 |
| 2020/0353969 A1* | 11/2020 | Sypitkowski | B62D 13/06 |
| 2021/0263513 A1* | 8/2021 | Liu | H04N 7/181 |

OTHER PUBLICATIONS

"A path following vehicle called Alice", located at https://platis.solutions/blog/2015/08/02/path-following-vehicle/ (Year: 2015).*

* cited by examiner

*Primary Examiner* — James M McPherson
(74) *Attorney, Agent, or Firm* — Frank Lollo; Eversheds Sutherland (US) LLP (57) ABSTRACT

Embodiments are directed to a trailer maneuvering assistant system onboard a vehicle to communicate with and receive control instructions from a mobile device app. In one example embodiment, the app interface presents the user with an engagement input area and a curvature command area. The user must provide two types of touch inputs to the user interface portions: a first touch input that includes a complex gesture input in the engagement interface portion. In one example embodiment the complex gesture may be user input of a closed geometric shape such as a circle, oval, rectangle, or some other shape. The input may be complex in that it matches a canonical model for the respective shape. Matching may include an input that is coterminous with the canonical model within a threshold amount of error, and/or meets another guideline or threshold such as being a closed shape, or some other predetermined requirement(s).

12 Claims, 5 Drawing Sheets

USER ENGAGEMENT SWITCH FOR REMOTE TRAILER MANEUVERING

TECHNICAL FIELD

The present disclosure relates to vehicle trailer maneuvering systems, and more particularly, to a non-memoryless user engagement switch for remote trailer maneuvering.

BACKGROUND

Trailer backup assist systems may provide an interface that allows a user to steer a vehicle trailer by providing an automated steering controller that provides the correct steering motion to move the trailer along the desired path curvature. Without an automated control mechanism, it can be counter-intuitive to manually steer a vehicle in order to provide the correct inputs at the steering wheel to direct the trailer along a desired path curvature.

Remote control of the driving vehicle from a location outside of the vehicle can also be challenging, even for Level-2 and Level-3 vehicle autonomy. Conventional systems for remote control of a parking-assisted vehicle may require two human hands for operation of the control device. System control tasks that require complex independent motions from both of the user's hands can be challenging, even for experienced operators.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to control a trailer maneuvering assistant system onboard a vehicle to communicate with and receive control instructions from an application (app) installed on a mobile device. The app interface presents the user with an engagement input area and a curvature command area. The user must provide two types of touch inputs to the user interface: a complex gesture, and an angle at which the user wishes to maneuver the trailer. The complex gesture (the first touch input) is performed in the engagement input area of the user interface, and the second touch input that includes the trailer curvature angle is performed in the curvature command area of the user interface. The complex gesture may include a closed geometric shape such as a circle, oval, rectangle, or some other shape. The input may be complex in that it matches a canonical model for the respective shape. Matching may include an input that is coterminous with the canonical model within a threshold amount of error, and/or meets another guideline or threshold such as being a closed shape, being approximately circular, ovular, or some other predetermined requirement(s).

The complex input sequence (e.g., the complex gesture) may be in the form of a rotary input where the user traces a path on a touchscreen that traverses a minimum angle threshold (such that the shape is not too small) and pixel threshold (such that the touch is not too light) prior to the user holding a left hand digit on the screen. The app may provide feedback to the user in the form of audible, haptic, and/or visual feedback. For example, when the user touches the curvature command area for the first time, a text and/or a voice may say "provide rotary input in highlighted area to begin vehicle motion." In another aspect, the feedback may indicate that the touch is too light, too heavy, the shape is too small, too large, not continuous, not adequately repeating, not long enough in duration, and/or some other feedback. The processor may present the engagement interface portion as a highlighted screen portion having a different level of illumination, different color, etc. with respect to the rest of the screen. When the user touches the highlighted area (indicating the engagement interface portion), an animated line sweeping through the minimum angle may be presented, over which (or approximately over which) the user's left hand digit may trace the complex gesture input. In one aspect, the first touch input is also the complex gesture input.

A combination of the first touch input with the complex gesture, either alone or in combination with a second touch input that provides a curvature command input for the steering angle may trigger the vehicle to begin vehicle motion. In an example embodiment, to maintain the vehicle motion, the user only needs to maintain contact in the user engagement interface portion and on the curvature command portion of the user interface on the mobile device. In another example embodiment, only the curvature command element will be shown at first. To maintain the vehicle motion, the user needs to maintain contact in the user engagement interface portion and on the curvature command portion of the user interface while providing the complex gesture input.

Once the user has completed the required input, the app may output an audible or visual message indicating instructions to continue touching the screen to maintain vehicle motion.

In another example embodiment, the engagement content and curvature command content are both shown continuously. The user can choose whether to satisfy the engagement interface portion condition first, or the curvature command portion condition first.

The present disclosure describes a mobile device interface configured with two input areas for user interaction that control the vehicle through the maneuvering assistant system. The mobile device program may segment the user interface of the device into two portions that include a curvature command interface portion and an engagement interface portion.

Embodiments described in this disclosure may evaluate user engagement using a one-time complex gesture, continuous contact with the mobile device interface screen, and touch input for steering or other similar functions. By providing an intuitive interface, a user may provide greater attention to the vehicle and task at hand without undue focus on complex interface operation.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
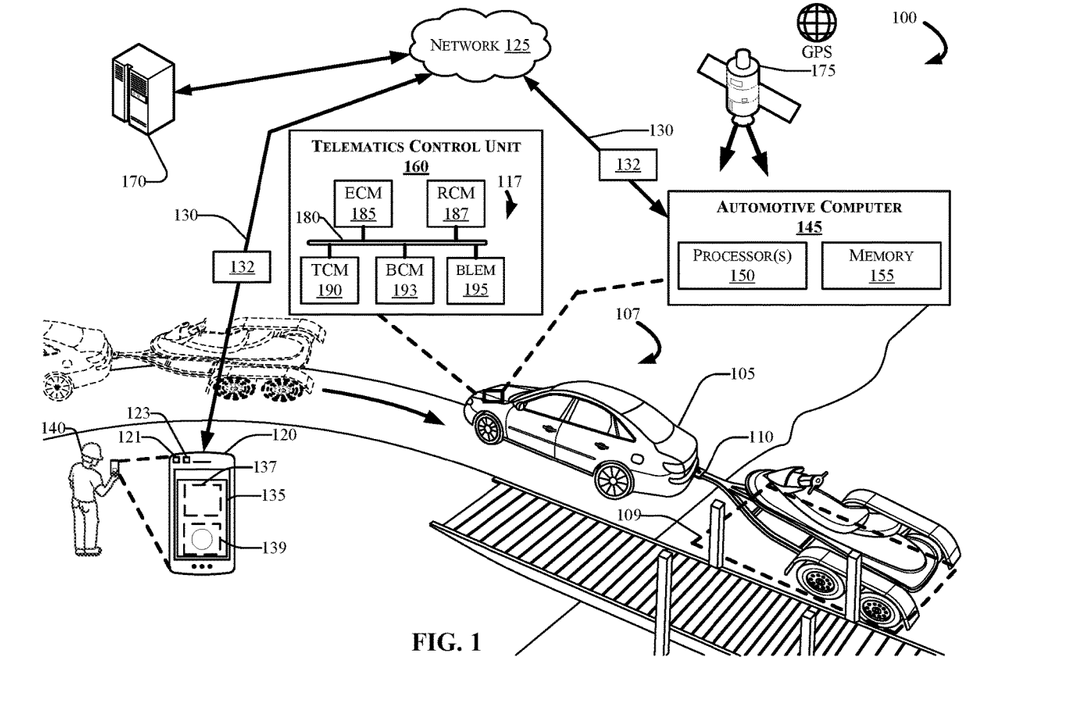
FIG. 1 depicts an example computing environment in which techniques and structures for providing the systems and methods disclosed herein may be implemented.

FIG. 1 depicts an example computing environment 100 that can include one or more vehicle(s) 105 comprising an automotive computer 145, and a telematics control unit (TCU) 160. A user 140 may operatively connect with the automotive computer 145 using a mobile device 120. The mobile device 120 may be communicatively coupled with the vehicle 105 via one or more network(s) 125, which may communicate via one or more wireless channel(s) 130. The mobile device 120 generally includes a memory 123 for storing program instructions for an application 135 that, when executed by a mobile device processor 121, performs aspects of the present disclosure. For example, the application 135 may include a remote trailer maneuver assist app that can coordinate user inputs to the interface areas indicating user engagement and control instructions for operating a remote trailer maneuver assist system 107 (hereafter "system 107"). The app 135 may be part of the system 107.

The vehicle 105 may include an automotive computer 145, which typically includes one or more processor(s) 150, and a memory 155. The vehicle 105 may further include a Telematics Control Unit (TCU) 160, which may be disposed in communication with and/or be a part of the automotive computer 145. The TCU 160 may, in some example embodiments, be disposed in communication with the mobile device 120, and one or more server(s) 170, which may be associated with and/or include a Telematics Service Delivery Network (SDN). The vehicle 105 may also receive and/or be in communication with a Global Positioning System (GPS) 175.

Although illustrated in various embodiments as a sedan or a sport utility, it should be appreciated that the vehicle 105 may take the form of another passenger or commercial automobile such as, for example, a car, a truck, a crossover vehicle, a van, a minivan, a taxi, a bus, etc.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes can include autonomy levels 1 through 4. A vehicle having level 1 autonomy may include a single automated driver assistance feature, such as for steering or acceleration. Adaptive cruise control is one such example of a level-1 autonomous system. Level-2 autonomy in vehicles may provide partial automation of steering and acceleration functionality, where the automated system(s) are supervised by a human driver that performs non-automated operations such as braking and other controls. Level-3 autonomy in a vehicle can provide conditional automation and control of driving features. For example, Level-3 vehicle autonomy typically includes "environmental detection" capabilities, and can make informed decisions for themselves, such as accelerating past a slow-moving vehicle, while the driver remains ready to retake control of the vehicle if the system is unable to execute the task. Level 4 autonomy includes vehicles having high levels of autonomy that can operate independently of a human driver, but still include human controls for override operation. Level-4 automation may also enable a self-driving mode to intervene responsive to a predefined conditional trigger, such as a road hazard or a system failure.

According to an example embodiment, a user 140 may control the application 135 (hereafter the application 135") operating on the mobile device 120 to receive user inputs for control of a remote trailer maneuver assist system 107. In some aspects, the system 107 may be a Level-2 autonomous vehicle system having autonomous features that control steering, motor engagement, braking, and other vehicle controls that may assist the user 140 to maneuver a vehicle trailer 110 to a target position/curvature 109.

In one aspect, the application 135 may include an engagement interface portion 137 and a curvature command interface portion 139. The user 140 may interact with the engagement interface portions 137 and 139 to control the vehicle 105 during trailer maneuvering operations.

In some aspects, the mobile device 120 may communicate with the vehicle 105 through the one or more wireless channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. For example, the mobile device 120 may transmit configuration messages 132 to the vehicle 105 (and more particularly, to the automotive computer 145). Communication via the wireless channel(s) 130 may be two-way communication. The wireless channel(s) 130 are depicted in FIG. 1 as communicating via the one or more network(s) 125.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The TCU 160 may provide a software and hardware infrastructure for performing aspects of the present disclosure. For example, the TCU 160 can provide communication and control access for two or more Electronic Control Units (ECUs) 117 using a Controller Area Network (CAN) bus 180.

The CAN bus 180 may be configured as a multi-master serial bus standard for connecting two ECUs as nodes using a message-based protocol that can be configured and/or programmed to allow the ECUs 117 to communicate with each other in applications. The CAN bus 180 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may use a linear bus configuration. In some aspects, the ECUs may communicate with a host computer (e.g., the automotive computer 145 and/or the server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance.

The ECUs 117, when configured as nodes in the CAN bus 180, may each include a central processing unit, a CAN controller, and a transceiver (not shown in FIG. 1). In an example embodiment, the ECUs 117 associated with the TCU 160 can include an Engine Control Module (ECM) 185, a Restraint Control Module (RCM) 187, a Transmission Control Module (TCM) 190, a Body Control Module (BCM) 193, and/or a Bluetooth Low-Energy Module (BLEM) 195. In some aspects, the TCU 160 may control aspects of the vehicle 105 through the control modules 185, 187, 190, 193, 195, etc., and implement one or more instruction sets received from the application 135 operating on the mobile device 120.

The BCM 193 is a processor-based power distribution center that can supervise, and control, functions related to the vehicle body such as lights, windows, security, door locks and access control, and various comfort controls. The central BCM 193 may also operate as a gateway for bus and network interfaces to interact with remote electronic control units (ECUs) for other systems. The ECUs 117 may control various loads directly via the CAN bus 180 communication or BCM 193.

The BCM 193 generally includes integration of sensors, vehicle performance indicators, and variable reactors associated with vehicle systems. The BCM 193 may coordinate a wide range of functions including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality.

The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The ECUs 117 are described for exemplary purposes only, and are not intended to be limiting or exclusive. Control and/or communication with other control modules not shown in FIG. 1 is possible, and such control is contemplated.

The automotive computer 145 may include one or more processor(s) 150 and a computer-readable memory 155. The automotive computer 145 may be installed in an engine compartment of the vehicle 105 (or elsewhere in the vehicle 105) as part of a remote trailer maneuver assist system, such as the system 107, in accordance with the disclosure. The automotive computer 145 may include, in one example, the one or more processor(s) 150, and a computer-readable memory 155. In other example embodiments, the TCU 160 may be integrated with and/or be incorporated with the automotive computer 145. The computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1). The one or more processor(s) 150 may utilize the memory 155 to store programs in code and/or to store data for performing trailer maneuvering assistance operations in accordance with the disclosure. The memory 155 may be a non-transitory computer-readable memory. The processor(s) 150 may be configured to execute computer-executable instructions stored in the memory 155 for performing various functions of the system 107 as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the TCU 160.

The memory 155 may store various code modules such as, for example, a secure communication controller (not shown in FIG. 1) for establishing the one or more wireless channels 130 (which may, in some embodiments, be encrypted channel(s)) between the mobile device 120, the TCU 160, and/or the automotive computer 145. The memory 150 may also receive the one or more instruction sets embodied as the configuration message(s) 132.

Figure 2:
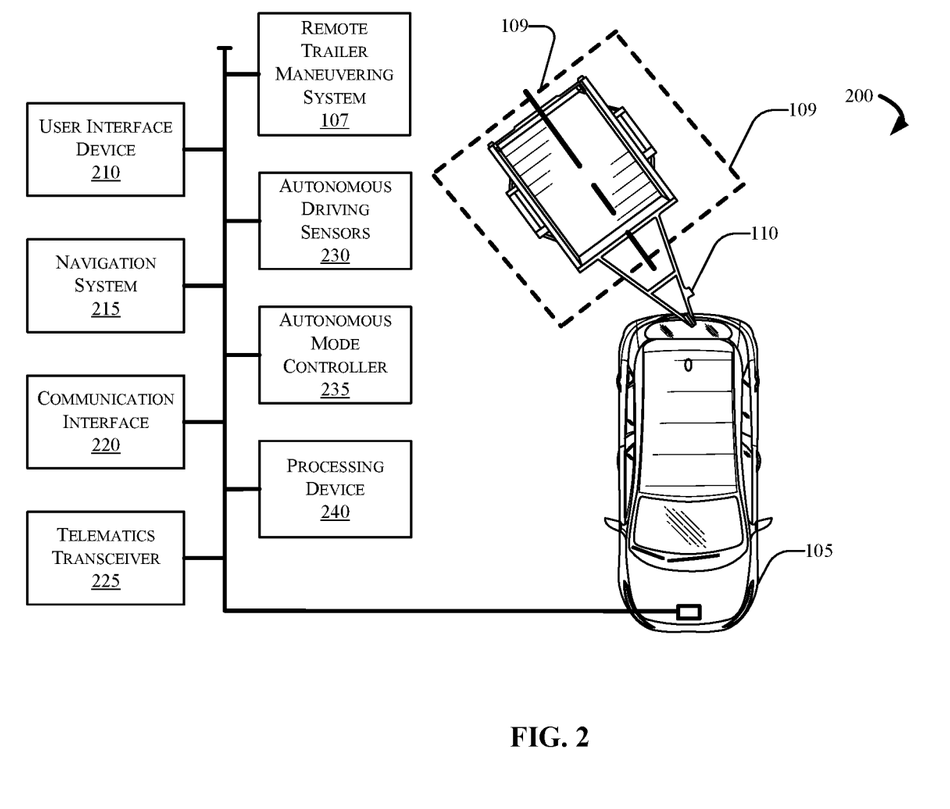
FIG. 2 depicts a functional schematic of an example control system that may be configured for use in an autonomous vehicle in accordance with the present disclosure.

FIG. 2 illustrates an example functional schematic of a control system 200 that may be configured for use in an autonomous vehicle 105. The control system 200 can include a user interface 210, a navigation system 215, a communication interface 220, a telematics transceiver 125, autonomous driving sensors 230, an autonomous mode controller 235, and one or more processing device(s) 240.

The user interface 210 may be configured or programmed to present information to a user, such as, for example, the user 140 depicted with respect to FIG. 1, during operation of the vehicle 105. Moreover, the user interface 210 may be configured or programmed to receive user inputs, and thus, it may be disposed in or on the vehicle 105 such that it is viewable and may be interacted with by a passenger or operator. For example, in one embodiment where the vehicle 105 is a passenger vehicle, the user interface 210 may be located in the passenger compartment of the vehicle 105. In one possible approach, the user interface 210 may include a touch-sensitive display screen (not shown in FIG. 2).

The navigation system 215 may be configured and/or programmed to determine a position of the vehicle 105, determine a position of the vehicle trailer 110, and/or determine a target position/curvature 109 to which the vehicle trailer 110 is to be maneuvered. The navigation system 215 may include a Global Positioning System (GPS) receiver configured or programmed to triangulate the position of the vehicle 105 relative to satellites or terrestrial based transmitter towers. The navigation system 215, therefore, may be configured or programmed for wireless communication. The navigation system 215 may be further configured or programmed to develop routes from a current location to a selected destination, as well as display a map and present driving directions to the selected destination via, e.g., the user interface 210. In some instances, the navigation system 215 may develop the route according to a user preference. Examples of user preferences may include maximizing fuel efficiency, reducing travel time, travelling the shortest distance, or the like.

The communication interface 220 may be configured or programmed to facilitate wired and/or wireless communication between the components of the vehicle 105 and other devices, such as a remote server (not shown in FIG. 2), or another vehicle (not shown in FIG. 2) when using a vehicle-to-vehicle communication protocol. The communication interface 220 may also be configured and/or programmed to communicate directly from the vehicle 105 to the mobile device 120 using any number of communication protocols such as Bluetooth®, Bluetooth® Low Energy, or Wi-Fi.

The communication interface 220 may also communicate using one or more vehicle-to-vehicle communications technologies. An example of a vehicle-to-vehicle communication protocol may include, for example, a dedicated short-range communication (DSRC) protocol. Accordingly, the communication interface 220 may be configured or programmed to receive messages from and/or transmit messages to a remote server (e.g., the server(s) 170 depicted with respect to FIG. 1) and/or other autonomous, semi-autonomous, or manually-driven vehicles (not shown in FIG. 2).

A telematics transceiver 225 may include wireless transmission and communication hardware that may be disposed in communication with one or more transceivers associated with telecommunications towers and other wireless telecommunications infrastructure (not shown in FIG. 2). For example, the telematics transceiver 225 may be configured and/or programmed to receive messages from, and transmit messages to one or more cellular towers associated with a telecommunication provider, and/or a Telematics Service Delivery Network (SDN) associated with the vehicle 105 (such as, for example, the server(s) 170 depicted with respect to FIG. 1). In some examples, the SDN may establish communication with a mobile device (e.g., the mobile device 120 depicted with respect to FIG. 1) operable by a user (e.g., the user 140), which may be and/or include a cell phone, a tablet computer, a laptop computer, a key fob, or any other electronic device. An internet connected device such as a PC, Laptop, Notebook, or Wi-Fi connected mobile device, or another computing device may establish cellular communications with the telematics transceiver 225 through the SDN.

The autonomous driving sensors 230 may include any number of devices configured or programmed to generate signals that help navigate the vehicle 105 while the vehicle 105 is operating in the autonomous (e.g., driverless) mode. Examples of autonomous driving sensors 230 may include a radar sensor, a lidar sensor, a vision sensor, or the like. The autonomous driving sensors 230 may help the vehicle 105 "see" the roadway and the vehicle surroundings and/or negotiate various obstacles while the vehicle is operating in the autonomous mode.

The autonomous mode controller 235 may be configured or programmed to control one or more vehicle subsystems while the vehicle is operating in the autonomous mode. Examples of subsystems that may be controlled by the autonomous mode controller 235 may include one or more systems for controlling braking, ignition, steering, acceleration, transmission control, and/or other control mechanisms. The autonomous mode controller 235 may control the subsystems based, at least in part, on signals generated by the autonomous driving sensors 230. In other aspects, the autonomous mode controller 235 may be configured and/or programmed to determine a position of the vehicle 105, determine a position of the vehicle trailer 110, and/or determine a target position/curvature 109 to which the vehicle trailer 110 is to be maneuvered, and control the vehicle 105 based on one or more inputs received from the mobile device 120. For example, the autonomous mode controller 235 may be configured to receive a configuration message comprising instructions for causing the autonomous vehicle controller 235 to position the vehicle trailer 110 at the target position/curvature 109 based on user inputs. The autonomous mode controller 235 may engage the vehicle 105 based on the configuration message, such that the engaging maneuvers the vehicle trailer 110 to a target position/curvature 109 by actuating the vehicle motor(s) (not shown in FIG. 2), steering components (not shown in FIG. 2) and other vehicle systems.

Figures 3A, 3B:
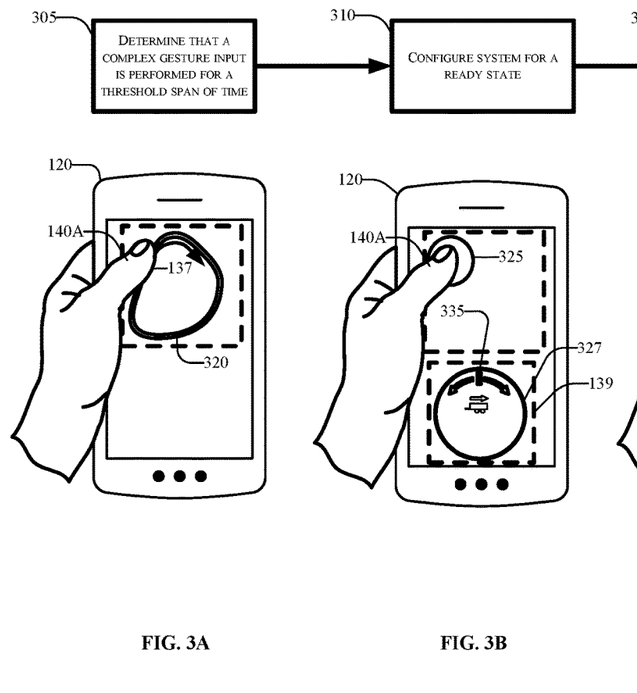
FIGS. 3A-3C illustrate various steps using an input device in accordance with the present disclosure.
Figure 3C:
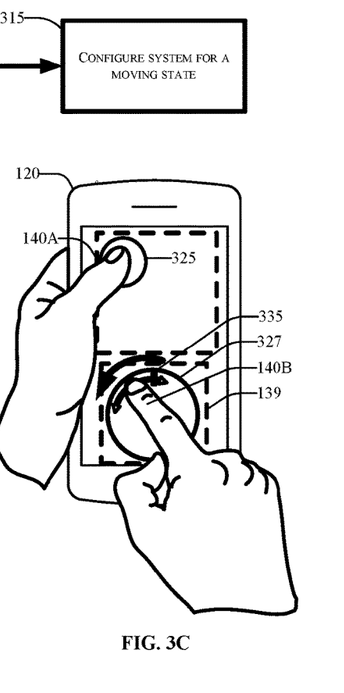

FIGS. 3A-3C illustrate various steps 305-315 for using the input device 120 to maneuver the vehicle trailer 110 to the target position/curvature 109 (as shown in FIGS. 1 and 2), in accordance with the present disclosure. In one example embodiment, the app presents the user with an interface that includes the engagement interface portion 137, as shown in FIG. 3A. The engagement interface portion 137 is an area of the app interface that receives user touch input that allows the system 107 to determine if the user 140 is engaged and/or attentive to the trailer maneuvering operation. The mobile device processor 121 (as shown in FIG. 1) may present the engagement interface portion 137 responsive to the first user digit 140A touching the engagement interface portion 137.

As shown at step 305, the mobile device processor 121 determines whether a complex gesture input to the curvature command interface portion 139 is performed by a first touch input for a threshold amount of time. In one aspect, the threshold amount of time may be undefined in that it can be any amount of time. In such an embodiment, the processor determines that the gesture is performed (the determination discussed hereafter) without regard to a length of time spent performing the gesture. In another aspect, the threshold amount of time may be for one second, three seconds, five seconds, etc.). Performing the gesture (e.g., the first input 320) may cause the mobile device processor 121 to present a curvature command interface portion 139, responsive to receiving the first touch input 320.

As depicted in FIG. 3B, the curvature command input portion 139 is an area of the user interface of the mobile device 120 configured to present controls for maneuvering the vehicle trailer 110 to a target angle/curvature as the vehicle 105 engages the drive wheel(s) for forward or backward motion. The curvature command interface portion 139 may include an indicator for a trailer curvature neutral position 335 that approximates no turning radius of the vehicle trailer 110. The curvature command interface portion 139 may receive a second touch (as shown in FIG. 3C) that rotates a output interface control 340 in the curvature command interface portion 139 to approximate a desired angle at which the user wishes to maneuver the vehicle trailer 110. For example, an angle associated with the rotation of the trailer curvature command input 330 may be indicative of the target curvature for maneuvering the vehicle trailer 110.

At step 310, the mobile device processor 121 may configure the system for a ready state. Configuring the system for a ready state may include sending the configuration message 132 (as shown in FIG. 1) to the automotive computer 145. In one aspect, the configuration message includes instructions for causing the autonomous vehicle controller 235 to maneuver the vehicle trailer 110 to the target position/curvature 109 based on the first touch input 320 and the second touch input 327.

Figure 4:
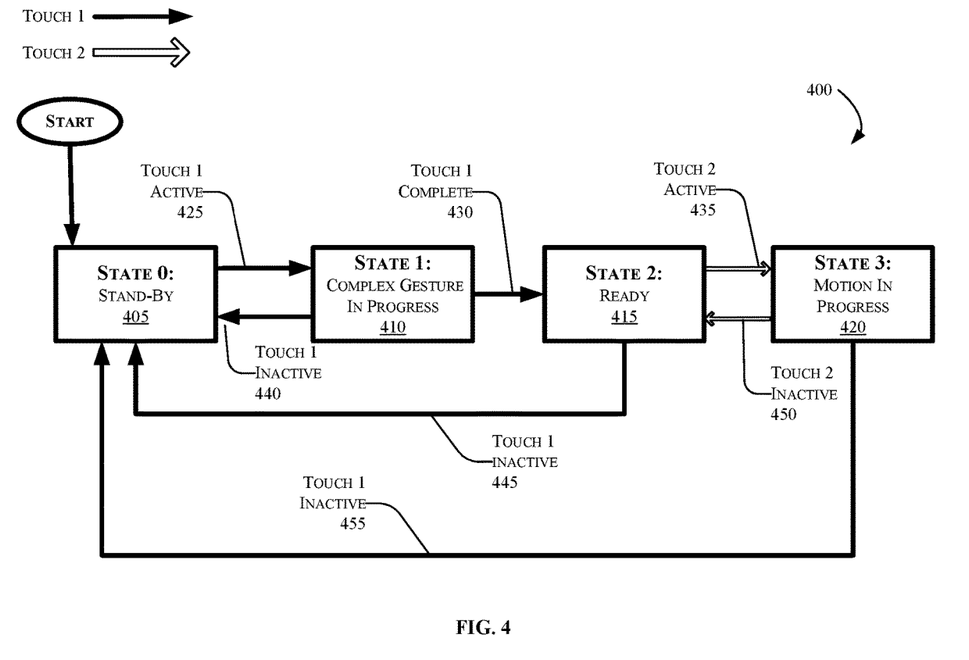
FIG. 4 depicts a state diagram of a state machine used in performing the embodiment of FIGS. 3A-3C in accordance with the present disclosure.

FIG. 4 depicts a state diagram 400 in accordance with the present disclosure. The system 107 may operate, according to the embodiment described with respect to FIG. 3, according to the state diagram 400. The state diagram 400 includes a first state 405 (State 0), a second state 410 (State 1), a third state 415 (State 2), and a fourth state 420 (State 3).

At State 0 (the state 405) the system 107 may rest in stand-by mode until a starting input triggers system initialization. The trigger may be, for example, the first touch input 320 (as shown in FIG. 3). Although the initializing input may include a touch that initializes the system 107, and thus, causes the mobile device processor 121 to present the engagement interface portion 137, the initializing input may not necessarily be a continuous touch input.

The system determines whether the first touch input is continuously active while completing the first touch input (step 425). The first touch input in the engagement interface portion 137 includes, in one embodiment, a complex gesture input that forms a closed geometric shape.

In one example embodiment, the user 140 must provide two types of touch inputs to the engagement interface portions 137 and 139 to engage the vehicle 105 for forward or backward motion to position the vehicle trailer 110. The user 140 may provide the first touch input 320 that includes a complex gesture input in the engagement interface portion 137, and also provide the second touch input, which includes the trailer curvature command input 330.

The mobile device processor 121 may present the engagement interface portion 137 as a highlighted screen portion having a different level of illumination, different color, etc. with respect to the rest of the screen. When the user 140 touches the highlighted area (indicating the engagement interface portion 137), an animated line sweeping through the minimum angle may be presented, over which (or approximately over which) the first user digit 140A may trace the complex gesture input. The app 135 may highlight the engagement interface portion 137. When the user 140 touches the highlight area (indicating the engagement interface portion 137), the mobile device processor 121 may present an animated curve or cursor, or other presentation that sweeps through an example complex geometric shape. By demonstrating the geometric shape with an animated example, a user (e.g., the user 140) may observe and repeat the desired geometric input that demonstrates that the user is engaged with the trailer maneuvering operation. For example, the sweeping curve animation may demonstrate various aspects that the system 107 will test against a canonical mode for the output shape, including size, minimum angle, and approximate touch force (expressed as an area of pixels associated with the first touch input). Once the user has completed the required input (e.g., by tracing the approximate path of the demonstrated geometric shape) the processor may provide further instructive output (either audibly or using text, or both) indicating instructions to continue touching the screen to maintain vehicle motion.

In one example embodiment, as shown in FIG. 3A, the first touch input 320 can be a complex gesture in the form of a rotary input where the user 140 traces a path on the mobile device 120 touchscreen. The mobile device processor 121 may determine that the complex gesture input satisfies one or more threshold attributes. For example, the processor 121 may determine that the first touch input 320 traverses a minimum angle threshold predetermined by the app 135 (such that the shape being traced by the first user digit 140A is not too small). In another aspect, the mobile device processor 121 determines that the first touch input 320 demonstrates a minimum and/or maximum pixel threshold associated with the first touch input 320 (such that the touch is not too light or too hard), or prior to holding the first user digit 140A on the screen. The app 135 may provide feedback to the user 140 in the form of audible, haptic, and/or visual feedback.

If the mobile device processor 121 determines at step 440 that the first touch input is inactive the mobile device processor 121 returns to State 0. In an example embodiment, the mobile device processor 121 may cause the mobile device to output feedback to the user 140 in the form of audible, haptic, and/or visual messages, where the feedback is associated and/or based on the first touch input 320. For example, when the user 140 touches the engagement interface portion 137 and/or another portion of the screen for the first time, a text and/or a voice may provide visual and/or auditory output indicating an instructive message such as, for example, "provide rotary input in highlighted area to begin vehicle motion." In another aspect, the feedback output by the mobile device processor 121 may be responsive to touch attributes associated with how the user 140 is interacting with the application, such as touch pressure, shape, etc. In one example, the mobile device processor 121 may indicate that the touch is too light, too heavy, the shape is too small, too large, not continuous, not adequately repeating, not long enough in duration, and/or some other feedback, and return to State 0.

In another aspect, the mobile device processor 121 may determine that the first touch input is inactive based on the span of time during which the data associated with the complex gesture is received at the engagement interface portion 137, and/or determine a number of iterations demonstrating the complex gesture is completed.

At State 1, the mobile device processor 121 determines that the first touch input is sufficient to trigger a gesture acquisition, signaling that a complex gesture is in progress. The complex gesture may continue to be in progress until such time as a finger is lifted from the face of the mobile device 120, motion is stopped, or a failure to enter the first touch input according to a predetermined characteristic. The characteristic may include the length of time during which continuous input takes place, the shape of the input, the pressure used to make the input, and other aspects. For example, when the span of time does not meet the predetermined threshold for a complex gesture or continuous input (e.g., 1 second, 5 seconds, etc.), the mobile device processor 121 may return to State 0. In another example, a predetermined number of iterations may be associated with a complete complex gesture, such as one iteration that includes a continuous curve forming a closed geometric shape that has a beginning touch point of the shape coterminous with an end portion of the same continuous shape (e.g., a circle or an ovaloid shape). In another aspect, the geometric shape that overlaps one or more times such that the first user digit 140A repeats the same shape in an approximately same or similar location on the engagement interface portion 137 may be considered a complete complex gesture.

As described herein, the touch input 320 (e.g., the complex gesture) may be "complex" in that it matches and/or approximates a canonical model (the model is not shown in FIG. 3) for a particular shape. A canonical mode may include geometric information associated with a shape, a pattern, or other geometric criteria. Matching can mean that the touch input 320 and the path of the first touch input 320 share the same pixels with the canonical model within a threshold amount of error (determined by a linear distance between the theoretical or canonical model and the shape input by the user 140).

In one example, at State 1, to determine whether the first touch input (the complex gesture) is complete at step 430, the mobile device processor 121 may determine a set of pixels selected by the first touch input 320, determine a set of pixels associated with the canonical model, and determine a percentage of pixels associated with the first touch input 320 are the same pixels as the pixels associated with the canonical model. Other methods of comparison are possible, and such methods are contemplated. The first touch input 320 may generate a shape that is analyzed by the mobile device processor 121 to determine whether the shape meets one or more other guidelines as well.

In another example, at step 430, the mobile device processor 121 may determine whether the first touch input 320 is a closed shape, and/or test the input for being approximately circular, ovular, and/or some other geometric shape. Other requirement(s) are contemplated.

Responsive to determining that the first touch input is complete at step 430, the mobile device processor 121 may proceed to State 2 and determine whether the second touch input at the curvature command interface portion 139 is continuously active.

At State 3, responsive to determining that the second touch input is active, the system 107 may progress with sending the vehicle 105 the configuration message 132 (as shown in FIG. 1) to the vehicle 105, and more particularly, to the automotive computer 145. The configuration message 132 may include instructions for causing the autonomous vehicle controller 235 to maneuver the vehicle trailer 110 to the target position/curvature 109 based on the first touch input and the second touch input. The combination of the first touch input with the complex gesture, either alone in combination with the second touch input, may provide the curvature command input for the steering angle, and may trigger the vehicle 105 to begin vehicle motion by engaging the vehicle motor(s), initiating autonomous driving sensors 230, and using other aspects of the control system 200 to control the vehicle 105 to maneuver the trailer into the desired position.

At step 435, the mobile device processor 121 determines whether the second touch input is continuously active. In one example embodiment, to maintain the vehicle motion, the user only needs to maintain contact in the user engagement interface portion with a continuous touch after the first touch input, while providing steering control using the curvature command interface portion 139 of the user interface on the mobile device.

In another embodiment, to maintain the vehicle motion, the user 140 needs to maintain contact in both the engagement interface portion 137 and on the curvature command interface portion 139 of the user interface of the mobile device 120 while concurrently providing the complex gesture input.

Responsive to determining that touch 2 has become inactive at step 450 the system 107 may return to State 2. This may mean that the user 140 is still attentive to the task, which is demonstrated by the continuous first touch input gesture. In another aspect, absent the first touch input being continuously active, at step 455 the mobile device processor 121 may return to State 0. At State 0 the system 107 is displayed after a starting input triggers system initialization. The trigger may be, for example, the first touch input 320 (as shown in FIG. 3). Although the initializing input may include a touch that initializes the system 107, and thus, causes the processor 121 to present the engagement interface portion 137, the initializing input may not necessarily be a continuous touch input.

Figure 5A:
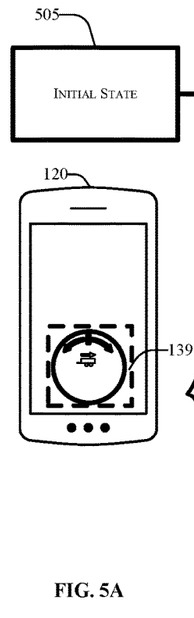
FIGS. 5A-5D illustrate various steps using an input device in accordance with another embodiment of the present disclosure.
Figure 5B:
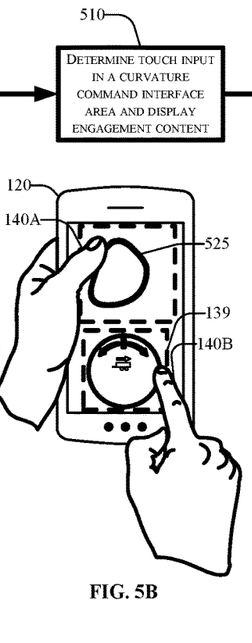

FIGS. 5A-5D illustrate another embodiment of the present disclosure, where the engagement interface portion 137 and the curvature command interface portion are continuously presented while in a stand-by mode (shown in FIG. 5A). As shown in FIG. 5B, and described as step 510, the processor 121 may determine that a touch input in the curvature command interface area is complete, which in the present embodiment, may include a mere touch by the second user digit 140B.

Figure 5C:
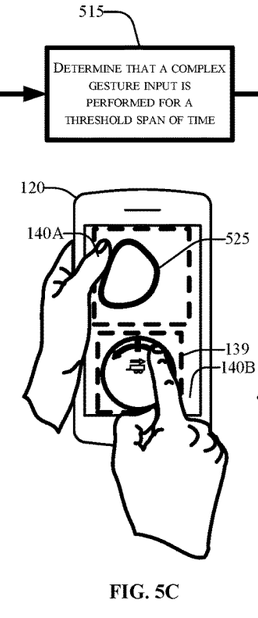
Figure 5D:
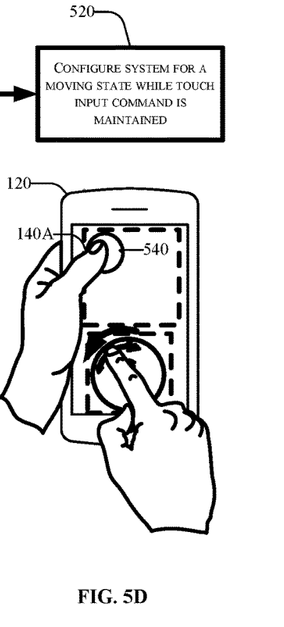

At step 515, as shown in FIG. 5C, the system 107 may determine that a complex gesture input 525 is performed for a threshold span of time. Responsive to determining that the threshold span of time has been met, and responsive to determining that the first touch input is continuous (depicted as continuous touch input 540 using the first user digit 140A), the processor 121 may configure the system 107 for a vehicle moving state at step 520. Accordingly, the processor 121 may generate and send the configuration message to the vehicle 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle to position a trailer, comprising:
   presenting, on a mobile device, an engagement interface portion;
   receiving a first touch input in the engagement interface portion;
   determining that the first touch input is a complex gesture input performed using a single hand that forms a closed geometric complex shape;
   determining continuous contact with the engagement interface portion; and
   sending a configuration message to the vehicle, the configuration message comprising instructions for causing an autonomous vehicle controller to maneuver the trailer to a target curvature based on the continuous contact with the engagement interface portion and based on determining that the first touch input forms the closed geometric complex shape;
   presenting, on the mobile device, a curvature command interface portion responsive to the first touch input; and
   receiving, via the curvature command interface portion, a second touch input comprising a curvature command input, the curvature command input indicative of a target curvature for the trailer.

2. The method according to claim 1, further comprising engaging the vehicle based on the configuration message, to position the trailer at the target curvature.

3. The method according to claim 1,
   wherein the complex gesture input is continuous and indicative of continuous touch input during a threshold span of time.

4. The method according to claim 1,
   wherein the first touch input in the engagement interface portion is a continuous touch input arising from continuous contact with a surface of the engagement interface portion; and
   wherein the first touch input is continuous during a threshold span of time.

5. The method according to claim 4, wherein determining continuous contact with the engagement interface portion comprises:
   receiving a set of input positions that indicate a touch position on the engagement interface portion; and
   saving the set of input positions to a memory register onboard the mobile device.

6. The method according to claim 5,
   wherein the set of input positions are associated with a complex gesture input; and
   wherein the set of input positions are indicative of an iteration of a closed geometric shape.

7. The method according to claim 1, wherein the instructions are further configured for causing an automotive computer on-board the vehicle for:
   actuating a steering mechanism based on a curvature command input;
   determining continuous contact with the engagement interface portion of the mobile device; and
   responsive to determining continuous contact, engaging a vehicle motor to position the trailer at the target curvature.

8. The method according to claim 7, wherein receiving the curvature command input indicative of the target curvature comprises:
   determining a second touch position associated with the curvature command input; and
   generating a steering instruction for wheel angle maneuvering based on the second touch position; and
   generating the configuration message to the vehicle, the configuration message based on the steering instruction and the first touch input.

9. The method according to claim 8, wherein receiving the curvature command input indicative of the target curvature comprises:
   determining continuous contact with the engagement interface portion of the mobile device; and
   responsive to determining continuous contact, sending the configuration message to an automotive computer on-board the vehicle to maneuver the trailer to the target curvature based on the curvature command input.

10. The method according to claim 9, wherein receiving the curvature command input indicative of the target curvature comprises:
    determining continuous contact with the engagement interface portion of the mobile device;

responsive to maintaining the continuous contact, determining continuous contact with a curvature command interface portion; and sending the configuration message to an automotive computer on-board the vehicle to maneuver the trailer to the target curvature responsive to determining continuous contact with both of a curvature command interface portion and the engagement interface portion of the mobile device.

11. A method for controlling a vehicle to position a trailer, comprising:

presenting, on a mobile device, an engagement interface portion;

receiving a first touch input in the engagement interface portion, the first touch input comprising a complex gesture input performed using a single hand that forms a closed geometric complex shape;

determining continuous contact with the engagement interface portion;

sending a configuration message to the vehicle, the configuration message comprising instructions for causing an autonomous vehicle controller to maneuver the trailer to a target curvature based on the continuous contact with the engagement interface portion;

presenting, via the mobile device, a curvature command interface portion responsive to the first touch input; and receiving, via the curvature command interface portion, a second touch input comprising a curvature command input, the curvature command input indicative of a target curvature for the trailer.

12. A system comprising:

a processor; and a memory for storing executable instructions, the processor configured to execute the instructions to:

present, on a mobile device, an engagement interface portion;

receive a first touch input in the engagement interface portion, the first touch input comprising a complex gesture input performed using a single hand that forms a closed geometric complex shape wherein the complex gesture input is continuous and indicative of continuous touch input for a threshold span of time;

determine continuous contact with the engagement interface portion;

send a configuration message to a vehicle, the configuration message comprising instructions for causing an autonomous vehicle controller to maneuver a trailer of the vehicle to a target curvature based on the continuous contact with the engagement interface portion for the threshold span of time;

present, via the mobile device, a curvature command interface portion responsive to the first touch input; and receive, via the curvature command interface portion, a second touch input comprising a curvature command input, the curvature command input indicative of a target curvature for the trailer.

* * * * *